United States Patent [19]

Otten et al.

[11] Patent Number: 5,228,469
[45] Date of Patent: Jul. 20, 1993

[54] FLUID CONTROL SYSTEM

[76] Inventors: Bernard J. Otten, 18161 Buena Vista Ave., Yorba Linda, Calif. 92686; Gary W. Warth, 4439 Sunflower Ave., Covina, Calif. 91724

[21] Appl. No.: 912,146

[22] Filed: Jul. 10, 1992

Related U.S. Application Data

[63] Continuation-in-part of Ser. No. 745,478, Aug. 15, 1991, Pat. No. 5,139,044.

[51] Int. Cl.[5] .............................................. F16K 17/38
[52] U.S. Cl. ...................................... 137/80; 137/460; 137/543; 137/554; 137/557; 73/861.77
[58] Field of Search ............... 137/554, 557, 542, 538, 137/543, 80, 460; 73/861.58

[56] References Cited

U.S. PATENT DOCUMENTS

| | | | |
|---|---|---|---|
| 1,514,839 | 11/1924 | Edwards et al. | 137/460 |
| 2,381,447 | 8/1945 | Hedene | 137/153 |
| 2,882,727 | 4/1959 | Newbold | 137/861.77 |
| 2,926,690 | 3/1960 | Martin | 137/460 |
| 3,636,767 | 1/1972 | Duffy | 73/229 |
| 3,712,327 | 1/1979 | Pagenkopf | 137/78.2 |
| 3,792,610 | 2/1974 | Kountanis et al. | 73/229 |
| 3,812,872 | 5/1974 | Block et al. | 137/62 |
| 4,209,131 | 6/1980 | Barash et al. | 239/69 |
| 4,337,655 | 7/1982 | Sundstrom et al. | 73/861.77 |
| 4,368,756 | 1/1983 | Carlson | 137/543 |
| 4,506,594 | 3/1985 | Rowland et al. | 73/861.64 |
| 4,545,396 | 10/1985 | Miller et al. | 239/69 |
| 4,635,668 | 1/1987 | Netter | 137/62 |
| 4,706,504 | 11/1987 | Jonak | 73/861.58 |
| 4,735,231 | 4/1988 | Jacquet | 137/459 |
| 4,809,742 | 3/1989 | Grau | 137/554 |
| 4,825,707 | 5/1989 | Rosaen | 73/861.77 |
| 4,848,148 | 7/1989 | Capriotti et al. | 73/861.77 |
| 4,877,051 | 10/1989 | Day | 137/486 |
| 4,885,943 | 12/1989 | Tootell et al. | 73/861.77 |
| 4,911,200 | 3/1990 | Ben-Arie | 137/486 |
| 4,921,001 | 5/1990 | Pittsinger | 239/70 |
| 4,926,903 | 5/1990 | Kawai | 137/78.2 |

FOREIGN PATENT DOCUMENTS

| | | | |
|---|---|---|---|
| 887409 | 12/1971 | Canada | 137/543 |
| 729139 | 12/1942 | Fed. Rep. of Germany . | |
| 1099814 | 2/1961 | Fed. Rep. of Germany | 137/538 |
| 2443610 | 3/1976 | Fed. Rep. of Germany | 73/861.58 |
| 2605642 | 8/1977 | Fed. Rep. of Germany | 73/861.58 |

Primary Examiner—A. Michael Chambers
Attorney, Agent, or Firm—Harness, Dickey & Pierce

[57] ABSTRACT

The fluid control device of the present invention combines a flow sensing unit in series with a control valve. The flow sensing unit is of the displacement piston type and the flow rate is electronically sensed. A single action poppet valve assembly facilitates the use of a self contained power supply for use in remote locations. A microprocessor monitors parameters including pressure, flow rate, temperature and flow volume, and is enabled to activate the control valve to the open or shut positions based upon any combination of the monitored parameters.

20 Claims, 9 Drawing Sheets

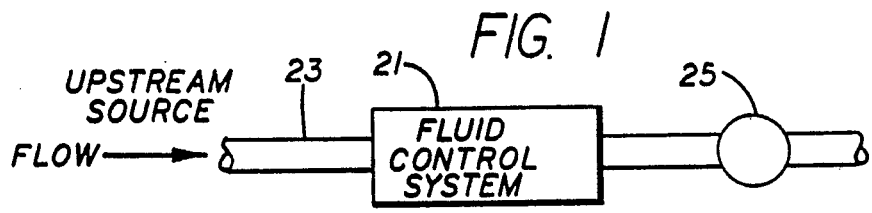
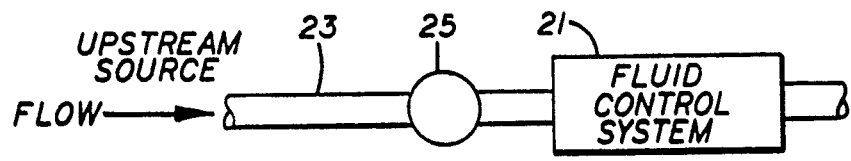
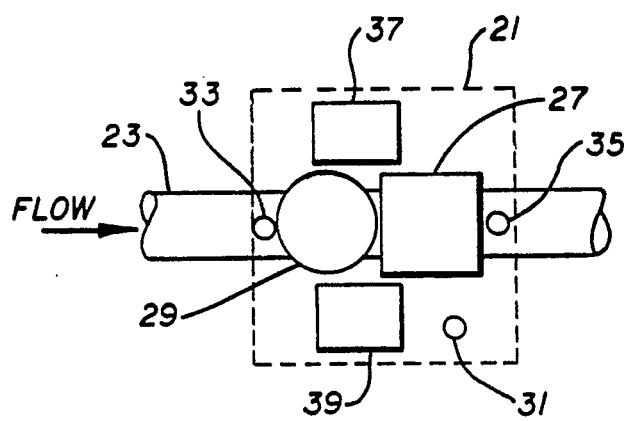
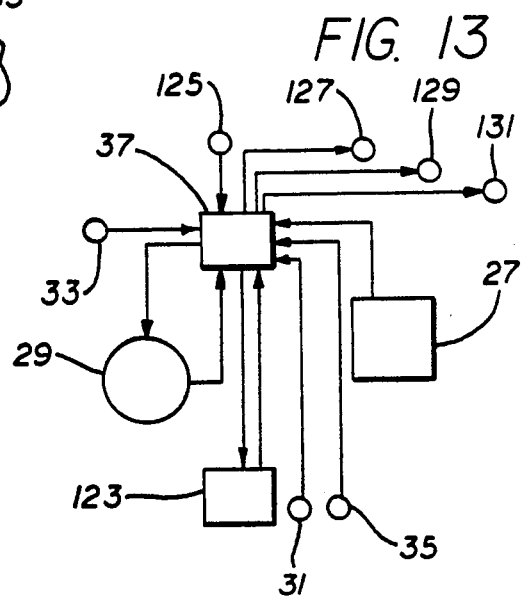
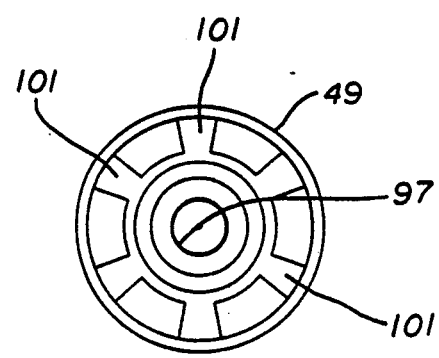
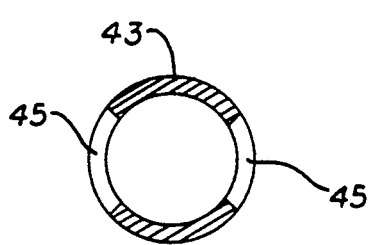

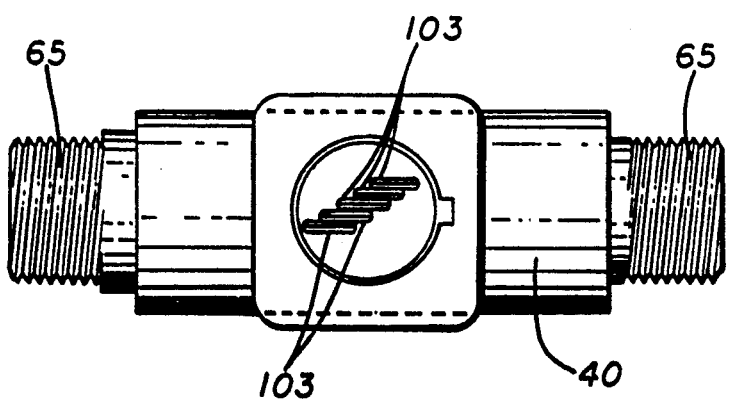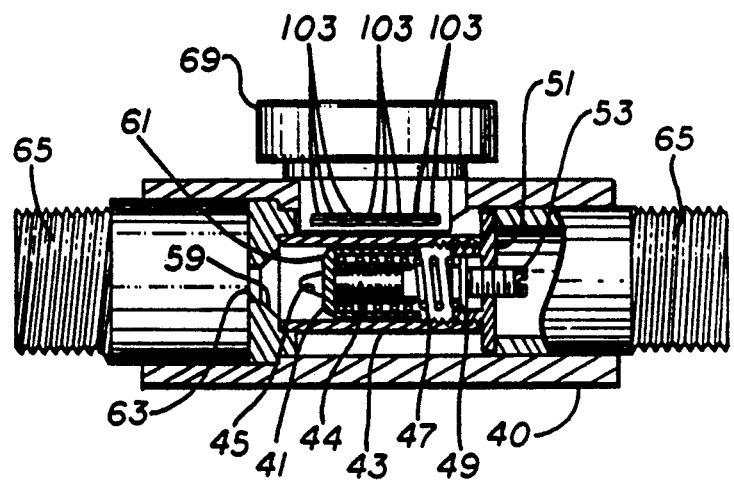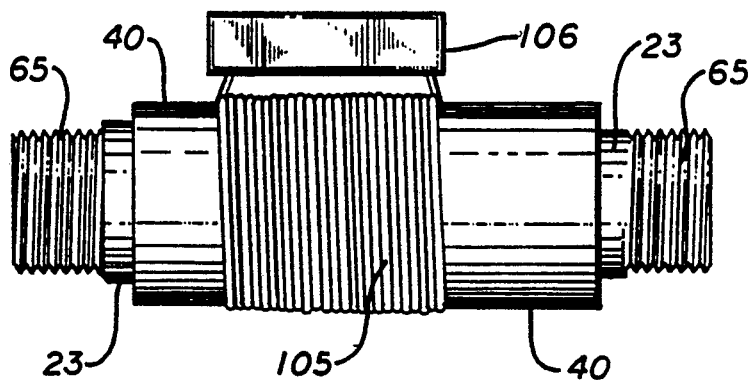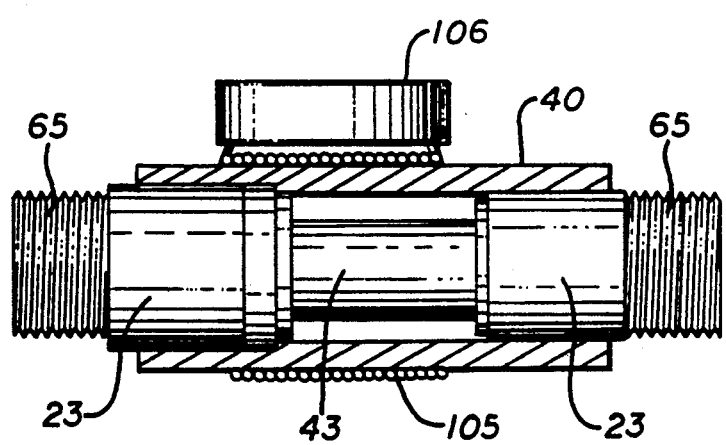

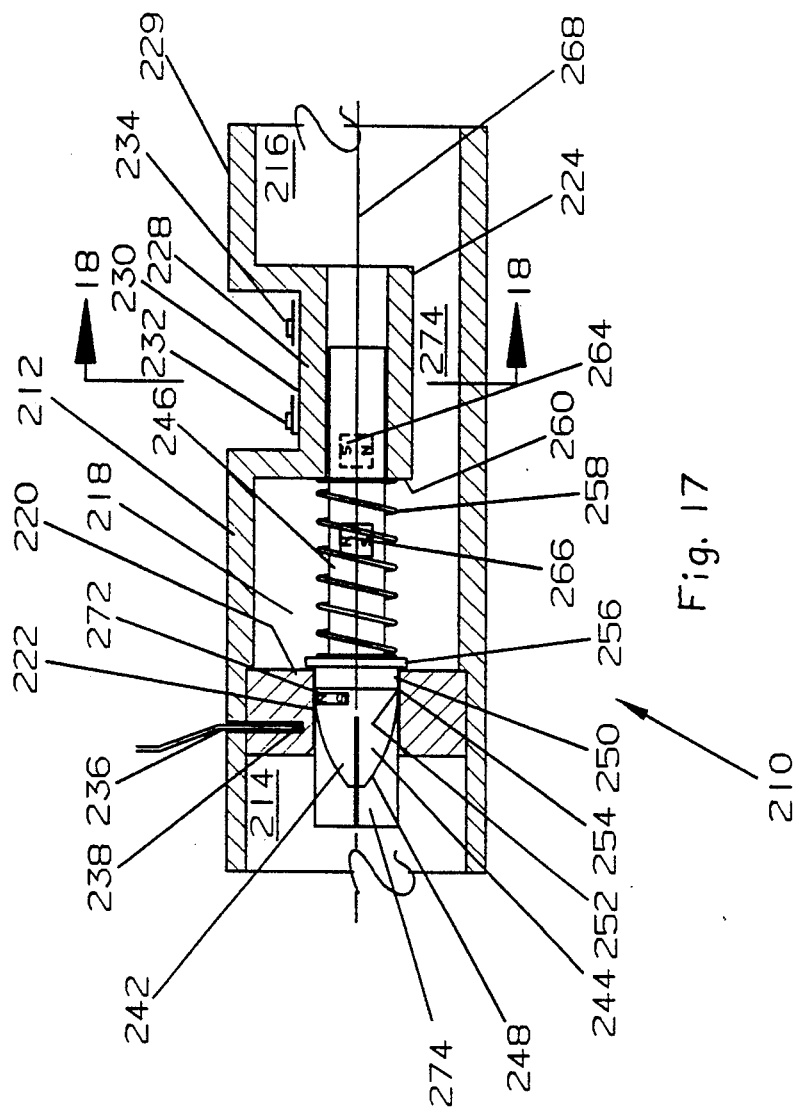
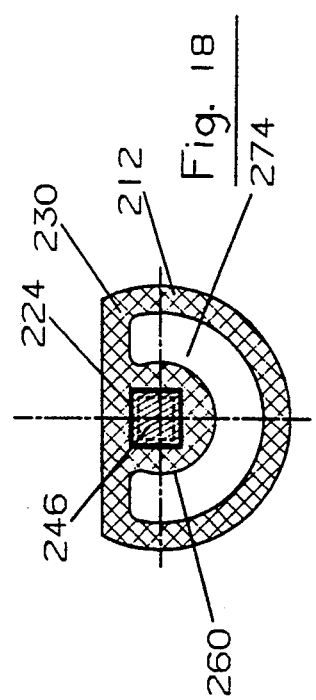
Fig. 17
Fig. 18

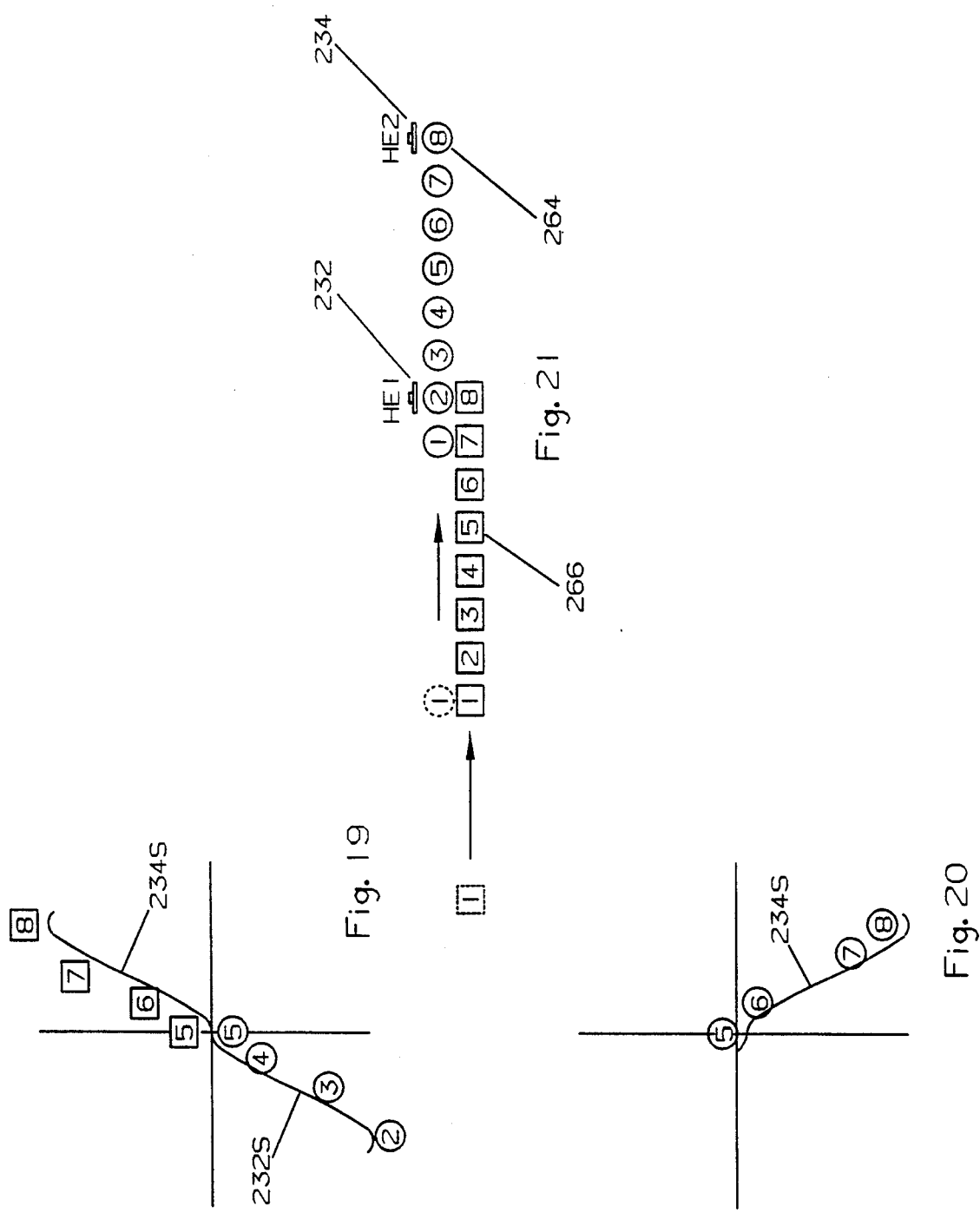

FLUID CONTROL SYSTEM

This is a continuation-in-part application Ser. No. 07/745,478 filed Aug. 15, 1991 now U.S. Pat. No. 5,139,044 issued Sep. 3, 1991.

BACKGROUND OF THE INVENTION

Unintentional loss of fluid control often results in many undesirable, expensive and dangerous conditions. Constant monitoring of devices requiring use of or providing application of fluids has in the past been costly, inconvenient or virtually impossible. Conduit ruptures, mechanical accidents, system failures, leaks or carelessness are only a few hazards contributing to this overall problem. These and other hazards are further discussed in Disclosure Document No. 248719 received by the Patent and Trademark Office Apr. 5, 1990.

By way of example, a freeze ruptured water pipe in a residence can result not only in an expensive utility bill, but also extensive water damage to the structure and landscaping. Leaky toilets contribute significantly to the overall waste of water resources. Accidentally broken sprinkler fixtures present domestic and public flooding problems as well as driving hazards along highways. Gas line ruptures resulting from natural catastrophes increase the likelihood of fire and explosion.

Each new circumstance presents a different control problem. A broken sprinkler fixture is often obvious, whereas a leaking subterranean supply line often is not. A running hose may be intentional, whereas a freeze ruptured water line is not.

Known flow monitoring systems include those systems which are attached to the main water distribution system and are set to shut off on the occurrence of an abnormally high flow condition, such as a system rupture. In large facilities such as chemical plants, flow rate control and timing may be performed with exactitude, but the size and cost of the equipment and the power required to effect the control makes such a system unworkable in smaller applications.

This is especially true in the case of remotely located points such as a water tap in a rural location such as for watering livestock, or a water tap located outside of a building, but away from the power necessary to actuate the flow of water.

SUMMARY OF THE INVENTION

The present invention addresses these fluid control issues. Different potential problems can be solved simultaneously with one device, and include, but are not limited to the detection of parameters such as small leaks, excess volume, excess rate, too high or too low fluid temperature, too high or too low ambient temperature, and too high or too low pressure. All of these parameters can be detected and monitored based on the desires of the operator. In response to the existence of one or more of these parameters, the flow may be shut off, an alarm sounded, or other devices actuated. This invention can monitor a single device or several devices sharing the same source of flow. Its control center may be integrated into a local housing or remotely located. Alarm systems may be mounted directly to the device or actuated by electrical, fiber optic, or radio/telephonic means, alerting an individual or an off-site control center.

The present invention is directed toward a fluid control system. The system includes a valve for moving between the open and closed positions, and a valve actuator for manually setting the valve to the open or closed position and triggerably actuating the valve to the closed or open position, respectively. The system also includes sensors to monitor physical parameters, and a microprocessor, coupled to the sensors and valve actuator, for processing the sensor data and triggering the valve actuator. In one possible embodiment, the sensors are flow rate sensors in series with the valve, for producing data indicative of the flow through the valve.

The valve actuator is manually operated to set the valve in its normal position. The normal position can be either open or closed, as required by the application. When the valve's normal position is open, the microprocessor can trigger the valve actuator to close the valve. Conversely, when the valve's normal position is closed, the microprocessor can trigger the valve actuator to open the valve.

All flow related, valve control and alarm functions of the fluid control system of this invention have the ability to be programmed into the device by the operator and may be readily overridden, if so desired, for manual operation at a particular installation. The four basic measured parameters are: temperature, pressure, volume, and flow rate. Each may function independently, or in unison. Basic operation begins when the operator enters the desired functions and their values. For example, if the sole responsibility of one device is to prevent water damage due to a freeze ruptured pipe, only the temperature function need be activated. At any time when the temperature drops below freezing for a pre-set period, the device may be programmed to go into an alarm state, thereby alerting the operator and/or actuating the supply valve. If the volume is to be monitored, for example, the operator may enter the maximum acceptable volume into the control panel of the fluid control system. If the entered volume is exceeded, the device may be programmed to alert the operator and/or actuate the supply valve. If the flow rate is to be monitored, the maximum desired flow rate is entered through the control panel of the fluid control system. Should this entered flow rate be exceeded, the device may be programmed to alert the operator and/or close the supply line. If pressure is to be monitored, for example, the operator may enter a minimum or maximum pressure such that if the pressure drops below or exceeds the pre-set limits, the device may be programmed to alert the operator and/or close or open the supply line.

Additionally, one, two, three or all four basic functions may be programmed in to monitor a device at the same time. As an example, a highway sprinkler system could be programmed to use all three functions. Should there be a danger of the temperature dropping too low, presenting a freeze danger, this parameter would be programmed to be monitored by the device. At the same time, if this sprinkler system is known to use only a certain volume of water during each cycle, the volume per cycle can also be programmed to be monitored. The fluid control device may be further programmed such that should a control valve to the sprinkler system fail to close, the fluid control device will take over, closing the valve and alert the operator. Also, if the maximum flow rate of water for this system is entered, that parameter can also be monitored and the fluid control device programmed to act based upon the flow parameter. For example, should a sprinkler head be broken off causing unrestricted flow, the fluid control device would sense it and, depending on its programming, could close the valve and/or alert the operator.

In addition to the added safety provided by monitoring fluid flow, the fluid control device of the present invention allows for parameter inputs from outside sources. As an example, in the case of a natural gas fire and explosion, the fluid control device may be placed in the gas line supplying fuel for a factory, business, home, or piece of equipment. In the event of an earthquake, a local utility company may selectively or collectively shut off any potentially damaged gas lines configured with this device by broadcasting a shutoff signal by radio control or over local alternating current lines. The fluid control device, when receiving the correct signal would shut the valve, thereby preventing unnecessary fire and/or explosion hazards. At the level of the single end user such as a home, the fluid control device could be programmed to shut the gas lines upon the occurrence of an excessive flow condition such as would be created in the event of a gas pipe rupture.

In another embodiment of the present invention, the fluid flow sensor comprises (1) a hollow housing having a chamber in communication with an opposing inlet and outlet, and a guide track within the chamber between the inlet and outlet, (2) a baffle located within the chamber between the inlet and guide track, the baffle having an orifice for fluid flow; (3) a piston having a tapered head and longitudinal shank, the piston adapted to move in and out of the orifice, the piston, when fully seated in the orifice, sealing off the orifice to prevent fluid flow through the chamber, the longitudinal shank adapted to be guided in the guide track and to move longitudinally within; (4) biasing means within the chamber biasing the piston into the orifice; (5) a first magnet within the longitudinal shank, the magnet arranged with its poles perpendicular to the longitudinal axis of the shank; and means for sensing magnetic flux changes located on the housing outside the chamber, the means for sensing adapted to sense the change of position of the first magnet when the shank is longitudinally moved as the piston is moved in and out of the orifice.

Preferably, the flow sensor will have a second magnet in the shank longitudinally spaced apart from the first magnet in a tandem fashion, the second magnet arranged with its poles perpendicular to the longitudinal axis of the shank and reverse to the poles of the first magnet. Thus, the second magnet would have its poles positioned with its north pole at the top and the first magnet would be positioned with its south pole at the top, or the like. Preferably, sensing means will comprise two sensing elements for sensing magnetic flux changes, the sensing elements being longitudinally spaced apart in tandem parallel to the longitudinal shank. Preferably the distance between the first and second magnets is substantially equivalent to the distance between the first and second sensor elements. To keep the piston centered with respect to the orifice and the track, the piston preferably has at least three guide elements extending axially in front of the tapered piston to guide the piston in and out of the orifice. At the location of the maximum diameter of the tapered piston, the surface of the piston has a semicircular circumferential groove extending around the piston. The groove receives an O-ring, and the O-ring forms a fluid type seal between the walls of the orifice and the surface of the piston to prevent fluid flow through the orifice when the piston is seated in the orifice. When the piston has backed out of the orifice a sufficient distance to have the O-ring clear the orifice walls, fluid can flow through the orifice between the orifice walls and the surface of the tapered piston. As the fluid flow increases, the tapered piston is forced further out of the orifice.

In the preferred embodiment of the present invention, a blind bore extends from the surface of the housing through the wall of the housing into the baffle. The floor of the wall is spaced closely to the orifice but sealed therefrom. The blind bore receives a reed switch which is normally closed. The tapered head of the piston is fitted with a magnet so that when the piston is fully seated, the magnetic field from the magnet induces the reed switch to an open position.

The reed switch is employed to prevent power drain on the system when the first and second sensors are not needed for sensing and thus do not require power. The reed switch acts as a fluid flow/no-fluid flow sensor. The reed switch can be connected to a microprocessor or to an alarm device to indicate flow/no-flow through the system. When a microprocessor is used in the system, during the no-fluid flow mode as sensed by the reed switch, the microprocessor can place itself in a low-power consumption mode thus saving on electrical power. This is especially useful when the system is operated with batteries. While in the low-power consumption mode, the microprocessor can check the reed switch continuously or periodically to determine the flow/no-flow status of the system. When the piston is moved, and the reed switch closes, the microprocessor can be programmed to power up the system and activate the first and second sensors in order to sense and calculate fluid flow. When the piston is seated in the orifice, there is no fluid flow, the reed switch is open, and the microprocessor places itself and the entire system into a low-power consumption mode and power to the sensors is shut off. However, when the piston is withdrawn from the orifice and fluid flow commences, the reed switch closes because of the weakening magnetic field caused by the withdrawal of the magnet in the piston from the vicinity of the reed switch. Although the system can be fabricated without a reed switch and can be operated very successfully without a reed switch, the reed switch does provide greater flexibility to the system and provides for a backup to the flow sensors, that is, if the sensors for some reason become inoperative, the microprocessor can monitor when flow has commenced or stopped by monitoring the reed switch.

Preferably the distance between the first and second magnets is substantially equivalent to the distance between the first and second sensor elements. The sensor elements can be Hall effect transducers, reed switches, or a tuned coil. To maintain the position of the magnets with respect to the reed switch and the sensor elements, the longitudinal shank preferably has a square cross-sectional area and the guide track has a square cross-sectional area to prevent the shank from rotating in the guide track.

BRIEF DESCRIPTION OF THE DRAWINGS

FIG. 1 is a schematic representation of the fluid control system of the present invention illustrated upstream of the flow appliance whose flow is to be controlled;

FIG. 2 is a schematic representation of the fluid control system of the present invention illustrated downstream of the flow appliance whose flow is to be controlled;

FIG. 3 is a schematic representation of the fluid control system of the present invention illustrating the sensor locations and control valve placement within a self-contained flow sensing unit;

FIG. 6 is a cross sectional detail taken along line 6—6 of FIG. 5;

FIG. 7 is a cross sectional detail taken along line 7—7 of FIG. 5;

FIG. 8a is a top view of a second embodiment of the flow sensor utilized in the present invention illustrating the location of a series of reed switches;

FIG. 8b is a side sectional view of the second embodiment illustrated in FIG. 8a;

FIG. 9a is a side view of a third embodiment of the flow sensor utilized in the present invention illustrating the location and use of a sensing coil;

FIG. 9b is a side sectional view of the third embodiment illustrated in FIG. 9a;

FIG. 13 is a schematic block diagram of the interrelationships between the basic components of the fluid control device of the present invention;

FIG. 17 is a sectional view of another embodiment of the flow sensor of the present invention;

FIG. 18 is a cross-sectional view of a flow sensor taken along lines 18—18 of FIG. 17;

FIG. 19 is a graph of the signal output of one of the sensors of the flow sensor of FIG. 17;

FIG. 20 is a graph of the signal output of another sensor of the flow sensor of FIG. 17; and FIG. 21 is a schematic representation of the positioning of the first and second magnets with respect to the first and second sensors of the flow sensor of FIG. 17.

DETAILED DESCRIPTION OF THE PREFERRED EMBODIMENT

Figure 4A:
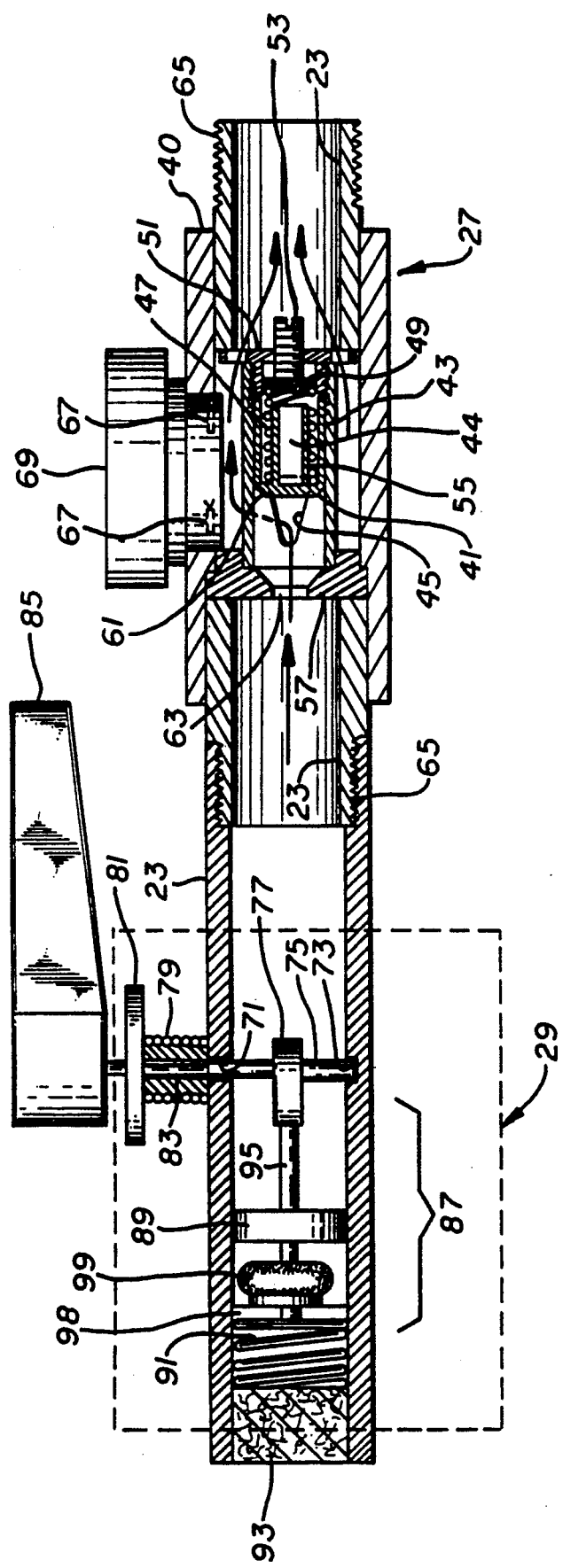
FIG. 4a is a sectional view of the control valve and flow sensing unit of the fluid control system of the present invention.

The following description of the preferred device is only used by way of example. Alternate designs will become readily apparent after examination of the detailed description hereinafter, and are covered by this patent.

Referring to FIG. 1, a block diagram representation of the fluid control system of the present invention, indicated generally by the reference numeral 21 is situated along a flow conduit 23. The appliance whose flow is to be monitored is indicated generally by the reference numeral 25, and is located downstream of fluid control system 21, as is indicated in reference to the relative position of fluid control system 21 and appliance 25 to the flow arrow 10.

Appliance 25 may be, in the event that flow conduit 23 is a water line, a sprinkler system, irrigation system, water rationing system, a water dispensing system, a flushing system or the like. Appliance 25 may be a liquid or gas product metering system for use at the point of sale. Referring to FIG. 2, the appliance 25 whose flow is to be monitored is located upstream of fluid control system 21, as is indicated in reference to the relative position of fluid control system 21 and appliance 25 to the flow arrow.

Referring to FIG. 3, a schematic representation of the fluid control system of the present invention illustrates the possible location of various sensors within the fluid control system 21 boundary indicated by the rectangular dashed line. Fluid control system 21 is shown schematically about the flow conduit 23, but in the preferred embodiment, the fluid control system actually forms a portion of the flow conduit 23.

Figure 11:
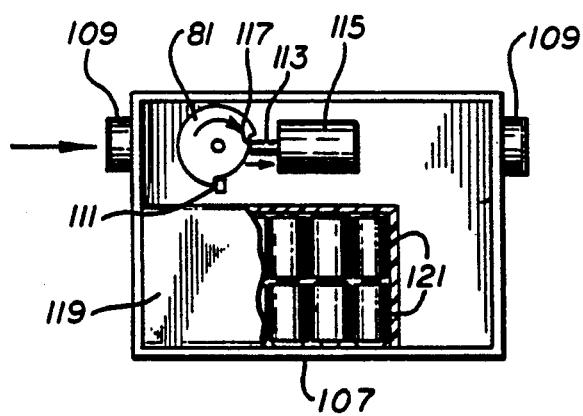
FIG. 11 is a plan view of the fluid control system of the present invention mounted in a housing.
Figure 12:
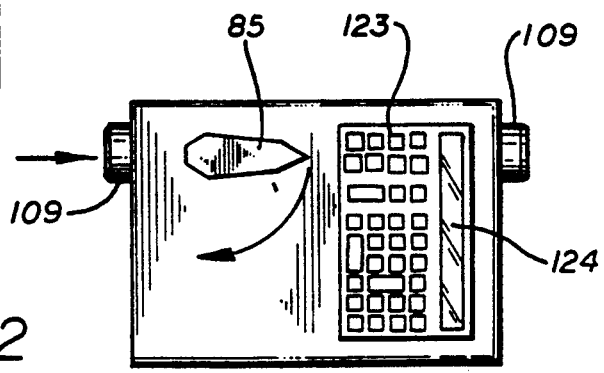
FIG. 12 is a plan view of the exterior of the housing of the fluid control system of FIG. 11.

Within the boundary of fluid control system 21 there may be collocated a series of components for sensing physical conditions pertinent to the fluid control system 21 of the present invention, including a flow sensing unit 27, a control valve 29, an ambient temperature sensor 31, a pressure sensor 33, a fluid temperature sensor 35, as well as a microprocessor 37, including its support circuits, to which the sensing components are connected. A control panel 39 is also connected to microprocessor 37 to facilitate the inputting of control information. Microprocessor 37 utilizes the control information to establish command parameters and to read information with which to compare the physical parameter information received by the components for sensing physical parameters, outlined above. Microprocessor 37 is enabled to act, depending upon the instructions of its programming, to trigger the control valve 29 and/or perform other functions. Virtually any of these physical condition parameters or information sensing components may be located remotely with respect to the boundaries of fluid control system 21 as necessity or convenience may necessitate, but it is believed that the maximum utility and convenience may be derived in the mounting of all of the components in a single housing (FIGS. 4a, 11 and 12).

Figure 5:
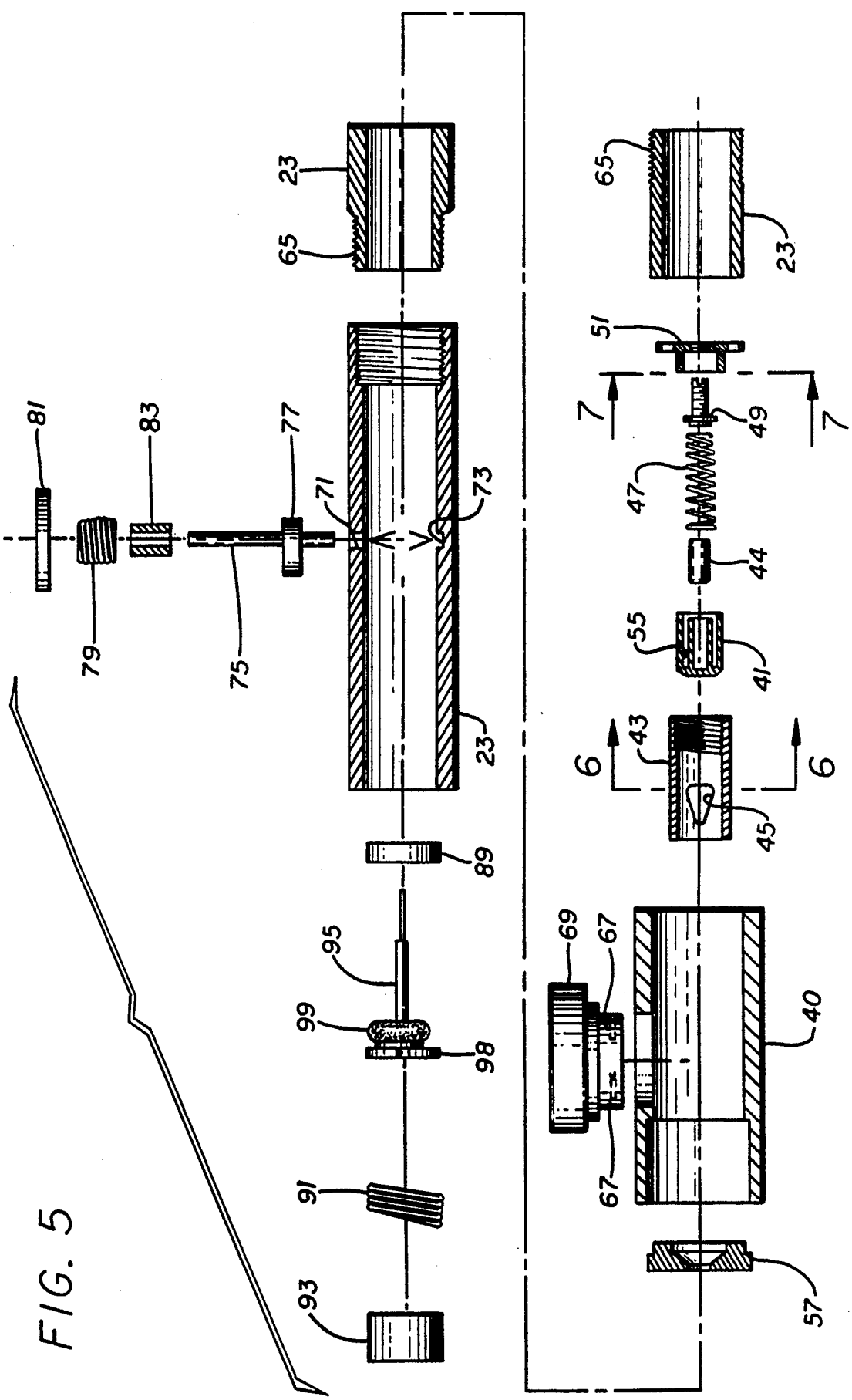
FIG. 5 is an exploded sectional view of the valve and flow sensing unit of the fluid control system of the present invention.

Referring to FIG. 4a and FIG. 5, a sectional view of the flow sensing unit 27 and the control valve 29 of the flow control system of the present invention is shown. A flow sensing unit housing 40 is connected to two threaded male unions 24. A displacement piston 41 is positioned in flow chamber 42 within a flow cylinder 43 within flow sensing unit housing 40. The middle portion of displacement piston 41 is fitted with a cylindrically shaped magnet 44. In the preferred embodiment, the magnet 44 is ferromagnetic. A cross section of flow cylinder 43 is best seen with respect to FIG. 6. Flow cylinder 43 slidably supports displacement piston 41. Flow cylinder 43 contains a pair of bilateral triangularly shaped apertures 45 through which the flowing fluid passes. The flow rate is proportional to the axial displacement of displacement piston 41, which in turn provides a differentially larger exposure of aperture 45 to fluid flow 10. A spring 47 is in position to urge displacement piston 41 in one direction while urging against a plug 49. Spring 47 is connected to displacement piston 41 within annular cavity 55. End cap 51 seals the rear end of flow cylinder 43 and adjustably supports adjustment screw 53. Plug 49 is fixedly attached to adjustment screw 53. The position of plug 49 is adjusted using adjustment screw 53.

Other flow chamber designs can be used that permit the flow rate through the flow chamber to increase proportionally as the piston is axially displaced. For example, the flow cylinder can have a tapered bore adapted to axially movably receive a compatible tapered piston. The passage or space between the tapered bore and tapered piston increases as the piston is axially moved away from the small end of the bore.

Displacement piston 41 forms one part of what may be referred to as a piston displacement type flow rate indicator. The operation of displacement piston 41 is similar to a class of flow indicating elements which are generally displaceable, under conditions of flow, against a constant force, such as the force of gravity or a proportional force, such as the force produced by spring 47. A circular radially inwardly disposed land 57 opposes the linear extent of travel of displacement piston 41 in the direction urged by spring 47. Land 57 has a beveled portion 59 angled to match a beveled portion 61 of displacement piston 41. Beyond the beveled portion 59 of land 57, a smooth bore 63 forms the concentrically smallest point of the fluid flowpath 10.

The operation of this spring opposed, piston displacement type flow sensing unit 27 is based upon the principle that a flowing fluid produces a force against an object in its flow path which is proportional to the flow of the fluid. Here, the increasing force on the displacement piston translates into increasing force on spring 47. The force exerted upon a spring produces a displacement of the spring. Therefore, the displacement of the displacement piston 41 is proportional to the force applied to the spring and to the flow.

Figure 4B:
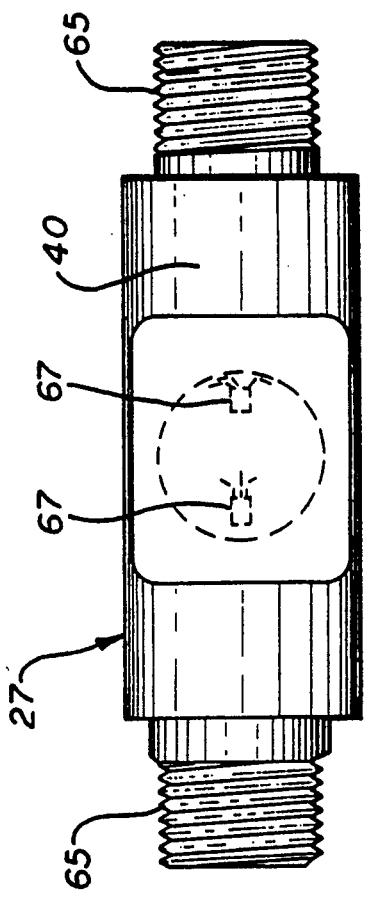
FIG. 4b is a top view of the sensing unit of FIG. 4a illustrating the placement of Hall effect sensors in dashed line format.

Referring to FIG. 4b, a top view of the flow sensing portion of the fluid control system of the present invention is illustrated. Referring to both FIGS. 4a and 4b, the incorporation of the flow sensing unit 27 of the present invention into a separate unit will maximize the degree to which the flow control system of the present invention can be assembled, repaired and interchanged for differing specifications with greater ease. The flow sensing unit 27 of FIG. 4b has a pair of threaded ends 65 to facilitate attachment thereof. The embodiment of FIGS. 4a and 4b utilize the Hall effect to detect the position of displacement piston 41. The detailed workings of the Hall effect will be explained later. In FIGS. 4a and 4b a pair of Hall effect sensors 67 are located within a flow sensing unit 27 adjacent the location of displacement piston 41. A service cap 69 provides easy service access to the Hall effect sensors 67 when necessary for maintenance, calibration, etc.

Referring to the left side of FIG. 4a and to the exploded view of FIG. 5, the control valve 29 and its component parts are illustrated. In the control valve 29 portion of flow conduit 23, a bore 71 having an axis perpendicular to the axis of flow conduit 23 is located at the upper side of flow conduit 23 and extends completely therethrough. A blind bore, or shaft dimple, 73 is located at the bottom interior portion of flow conduit 23 and extends into the inner surface of flow conduit 23 just far enough to form a lower journal, along with the upper journal provided by bore 71, for a rotatable shaft 75.

Along the portion of rotatable shaft 75 located at the center of flow conduit 23 is attached a cam disk 77. Rotatable shaft 75 extends through cam disk 77 at a point offset from the radial center of cam disk 77. At the upper portion of rotatable shaft 75, a torque spring 79 surrounds rotatable shaft 75 and extends from the exterior portion of flow conduit 23 to an anchoring disk 91 fixedly mounted to the rotatable shaft 75. A retainer nut 83 holes rotatable shaft 75 in place within flow conduit 23, threadably turnable onto a boss 84 portion of the exterior of flow conduit 23. A valve handle 85 is mounted atop rotatable shaft 75. The valve handle 85 is utilizable to urge movement of rotatable shaft 75 in a direction against the rotatable urging of torque spring 79. As will be shown, anchoring disk 81 is utilizable to limit the range of movement of rotatable shaft 75, and to set rotatable shaft 75 in a particular orientation for triggering.

Control valve 29 consists of poppet valve assembly 87, valve seat 89, valve spring 91, retainer 93 and poppet valve shaft 95. Poppet valve assembly 87 is opened and controlled by poppet valve shaft 95.

Valve seat 89 provides a face surface generally perpendicular to the axis of flow conduit 23. Referring to FIG. 7, a cross section of the valve seat 89 is illustrated with respect to line 7—7 of FIG. 5. At the center of valve seat 89 is a journal 97 for axially slidable support of the poppet valve shaft 95. The valve seat has a plurality of flow passages 101 to permit fluid flow to pass through valve seat 89. Liquid flow can proceed through the valve seat 89, so long as the face 102 and passages 101 of valve seat 89 are not covered by "O"-ring 99 of the poppet valve assembly. A guide disk 98 is attached at the opposite end of poppet valve shaft 95 and, along with journal 97 in valve seat 89, serves to keep poppet valve shaft 95 aligned against cam disk 77.

Rotation of rotatable shaft 75 is used to linearly move poppet valve shaft 95 by cam action, and thereby control poppet valve assembly 87. To open poppet valve assembly 87, rotatable shaft 75 is turned so that cam disk 77 pushes poppet valve 95, and thereby "O"-ring 99, away from valve seat 89. This action uncovers the face of valve seat 89 and allows fluid flow as described above.

Referring to FIG. 5, the phantom poppet guide disk, "O"-ring, and poppet valve shaft illustrate their interaction with valve seat 89 when rotatable shaft 75 is turned to close poppet valve assembly 87. Valve spring 91 urges the poppet guide disk and "O"-ring against valve seat 89 to cover the face of valve seat 89 and prevent fluid flow. Although a poppet valve assembly is shown, other types of valve assemblies may be used, such as butterfly valves, gate valves, ball valves and the like.

In the fluid control system of the present invention, three methods are used for signaling recognition of the linear displacement of displacement piston 41, corresponding to three embodiments, including the use of the Hall effect, the use of magnetically actuatable reed switches, and the use of a tuning coil.

Referring to FIGS. 4a-7, several views of the valve and flow sensing unit of the fluid control system of the present invention were illustrated. Flow sensing unit 27, represented in dashed line format, included an area for attachment to a control valve 29. In those views of the invention, the flow sensing unit 27 was illustrated with Hall effect sensors 67. These devices assist in sensing the axial position of displacement piston 41 and thus enable flow detection.

Although the principles of the Hall effect transducers 67 are well known, and not specifically the subject of the invention herein, the Hall effect sensors 67 are responsive to the position of the magnet 44 within displacement piston 41, to thereby produce an output signal indicative of the fluid flow in flow conduit 23. Current flow in a conductor which is under the influence of a magnetic field does not flow evenly through the conductor. The degree of uneven distribution of current flow is proportional to the strength of the magnetic field. In the first embodiment of the invention, a magnetic field from the magnet 44 affects the pair of Hall effect sensors 67 in relation to the axial position of displacement piston 41. Hall effect sensors 67 include a plurality of leads, as is indicated with reference to FIGS. 4 and 5, for accepting a supply of current to the Hall effect sensors 67 and the outputting of a signal, which, by virtue of the principles previously discussed, will be indicative of fluid flow within flow conduit 23.

Referring to FIGS. 8a and 8b, a second embodiment employing the use of a series of magnetically actuatable reed switches 103 is illustrated in top and side view, respectively. The use of magnetically actuatable reed switches 103 also requires that the displacement piston either be made of magnetized ferromagnetic material or have magnet 44 mounted therein. The reed switches 103 are located adjacent the flow piston 41 and similarly protected by the service cap 69. Each reed switch 103 closes its contacts when it sufficiently comes close enough to flow piston 41 to come under the influence of the magnetic field generated by the magnet 44.

The logic schemes available to determine the location of displacement piston 41 can include the sequential closure of only the reed switch 103 in the vicinity of the strongest point of the magnetic field, or the sequential closure of a line of switches up to the point where a threshold magnetic potential is present, near some defined point on displacement piston 41. A series of resistors, possibly of different values, may be used in conjunction with the reed switches 103 to give a total resistance signal as an indication of the position of displacement piston 41.

Referring to FIG. 9a and 9b, a third embodiment of the fluid control system of the present invention utilizing a tuning coil 105 is illustrated in side and side sectional view, respectively. Tuning boil 105 consists of a conductor wrapped about the outside of flow sensing unit housing 40. Flow cylinder 43 contains piston 41, magnet 44, spring 47 and plug 49 as shown in FIG. 8b. The flow cylinder has apertures 45, and is connected to land 57 and end cap 51. In FIG. 9b the flow cylinder 43 is shown in plan view in unit housing 40 between two threaded male unions 24. Note the somewhat offset position of the tuning coil 105 with respect to flow sensing unit 27. An axially offset position of tuning coil 105 offers a more significant change in inductance per unit displacement of displacement piston 41. As the displacement piston 41 moves into and out of the tuning coil 105, the inductance of tuning coil 105 changes. The inductance of tuning coil 105 at any given time may be tested with known circuitry. The inductance of tuning coil 105 is therefore proportional to the displacement of displacement piston 41, which is, in turn, proportional to the flow of fluid through flow sensing unit 27.

An electronics unit 106 sits adjacent and somewhat away from coil 105. Electronics unit 106 may be used to house the circuitry necessary to energize coil 105, as well as the circuitry necessary to measure changes in the inductance of coil 105. Since inductance represents a barrier to alternating current flow, circuitry locatable in electronics unit 106 would probably perform both functions. In FIG. 9b the flow cylinder 43 is shown in plan view in unit housing 40 between two threaded male unions 24.

Figure 10A:
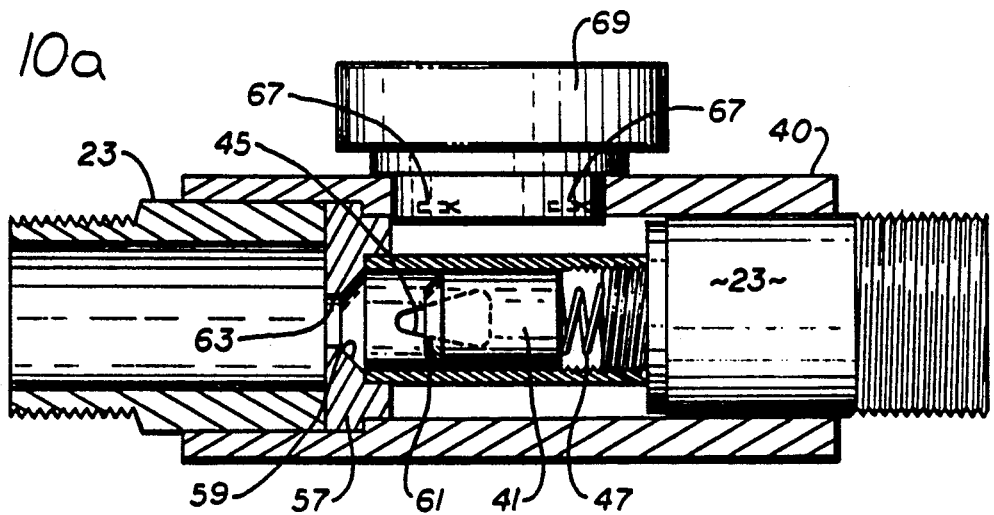
FIG. 10a is a side sectional view of the flow meter portion of the first embodiment of the present invention in the flowing condition.
Figure 10B:
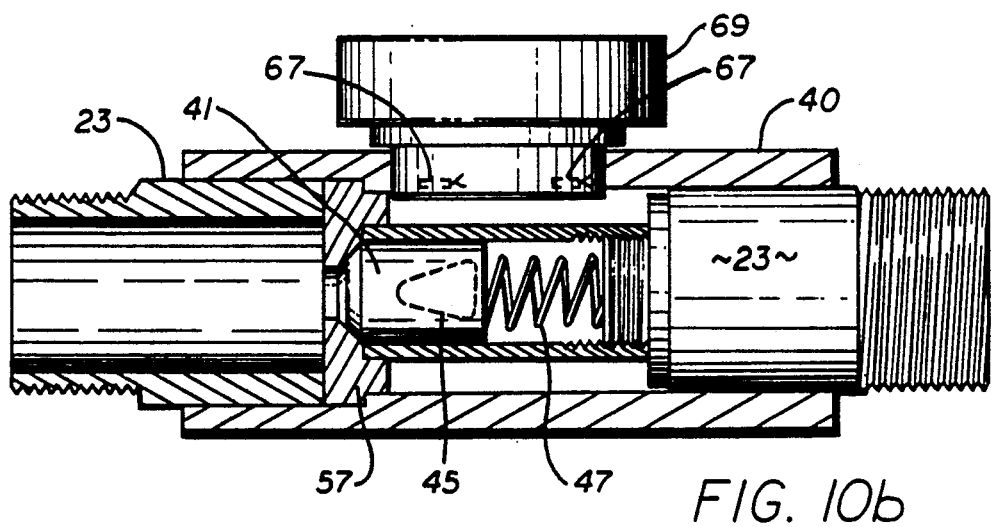
FIG. 10b is a side sectional view of the flow meter portion of the first embodiment of the present invention in the non-flowing condition.

Referring to FIGS. 10a and 10b, a sectional view of the operation of the fluid control system of the present invention is illustrated. The components in the FIGS. 10a and 10b are the same as those shown in FIGS. 4a-7. FIG. 10a illustrates the displacement of displacement piston 41 in response to fluid flow. As displacement piston 41 is displaced in the downstream direction to enable the flowing fluid to pass through apertures 45, spring 47 is compressed. When no fluid flow occurs, the displacement piston 41 is urged completely in the upstream direction until the beveled portion 59 of land 57 contacts the beveled portion 61 of displacement piston 41.

Referring to FIG. 11, a plan view of the fluid control system 21 of the present invention mounted in a housing 107 is illustrated. At the left and right sides of housing 107, a pair of connectors 109, such as those used in conjunction with an ordinary water hose, facilitates the connection of the fluid control system 21 and housing 107 to a standard water supply device such as a threaded water tap.

In FIG. 11, the rotatable shaft 75 and anchoring disk 81 are visible. One fourth, or 90° of the circumference of anchoring disk 81 has a reduced radius. Adjacent the reduced radius, a bump stop 111 determines the radius of turn of anchoring disk 81 and therefore shaft 75. Here, it is readily seen that the angle of turn available to rotatable shaft 75 is about 90°. This angle of turn is sufficient to move valve assembly 87 of FIGS. 4a and 5 from the fully open to fully shut position. Typically, the fluid control system 21 of the present invention will be "cocked" to the open position and "tripped" to the closed position, but the fluid control system may be configured to be "cocked" to the closed position and "tripped" to the open position, particularly when time, temperature, static pressure or any other non-flow based quantity is utilized as a set point.

The system can be used to trip or signal a variety of other devices. For example, if the valve is closed on a cooling line to a condenser, the system can be used to shut off the heat source of a distillation unit and the feed pumps.

Adjacent anchoring disk 81, a solenoid plunger 113, slidably housed within a solenoid coil 115, engages the edge 117 or transition boundary between the quarter turn of lesser radius and the outermost radius of the anchoring disk 81. Solenoid plunger 113 is springingly urged outwardly toward anchoring disk 81 via a spring (not shown), and drawable into the coil 115 upon the application of a current to the solenoid coil 115 as is well known. With regard to the embodiment of FIG. 11, the anchoring disk 81 is in cocked position, and torque spring 79 is urging shaft 75 and anchoring disk 81 in a clockwise direction, its movement prevented by the engagement of solenoid plunger 113 with edge 117. Upon triggering, the solenoid plunger 113 disengages edge 117, and rotatable shaft 75 is urged one quarter turn by torque spring 79. Poppet valve assembly 87 then assumes a closed position or an open position, depending on whether the poppet valve assembly 87 was initially set open or closed positions, respectively. A battery housing space 119 is provided for insertion of batteries 121 for enabling the fluid control system 21 to become an electrically self contained unit. Batteries within battery housing space 119 operate both the microprocessor 37 (not visible in FIG. 11) and the solenoid coil 115.

Referring to FIG. 12, in the completed and fully assembled fluid control system, the valve handle 85, to facilitate manual actuation, is exposed to the exterior of the unit to facilitate easy cocking or setting of the control valve 29 of the flow control system 21. In addition, an externally exposed input keypad 123 is, provided to facilitate manually adjustable programming of the instructions for flow control by an operator. Keypad 123 may have any combination of numerical and designated function key inputs. Keypad 123 has a keypad display 124 to yield a visual display for use in conjunction with microprocessor 37. The keypad display 124 facilitates programming of microprocessor 37 by providing a visual display of the programmed configuration for checking the user selected operational parameters and to assist in the orderly programming of microprocessor 37 by providing prompts to the user to enable orderly, accurate and easy programming. The keypad can be remotely connected to the system.

Referring to FIG. 13, a block schematic of fluid control system 21, in addition to the previously mentioned components, has a set of I/O, or input-output ports 125 which can be connected to other valve controls such as a remote sensor, an audio alarm output port 127, visual alarm output port 129, and option port 131 all communicating with microprocessor 37. I/O port 125 would typically be utilized to communicate data, and/or instructions, to another location, either real-time as it occurs, or in a batch manner to collect the flow profile data.

Other structures which are also pictured in FIG. 13 include the previously discussed control valve 29 which has both an input and an output connection with microprocessor 37. The flow sensing unit 27 ambient temperature sensor 31, pressure sensor 33, fluid temperature sensor 35 are the same as was illustrated in FIG. 3. Both the control valve 29 and keypad 123 have, and are shown as having both an input from and an output into microprocessor 37. Therefore, microprocessor 37 can both control and sense the position of control valve 29. Microprocessor 37 can receive inputs from keypad 123 and display information to the keypad display 124.

Figure 14:
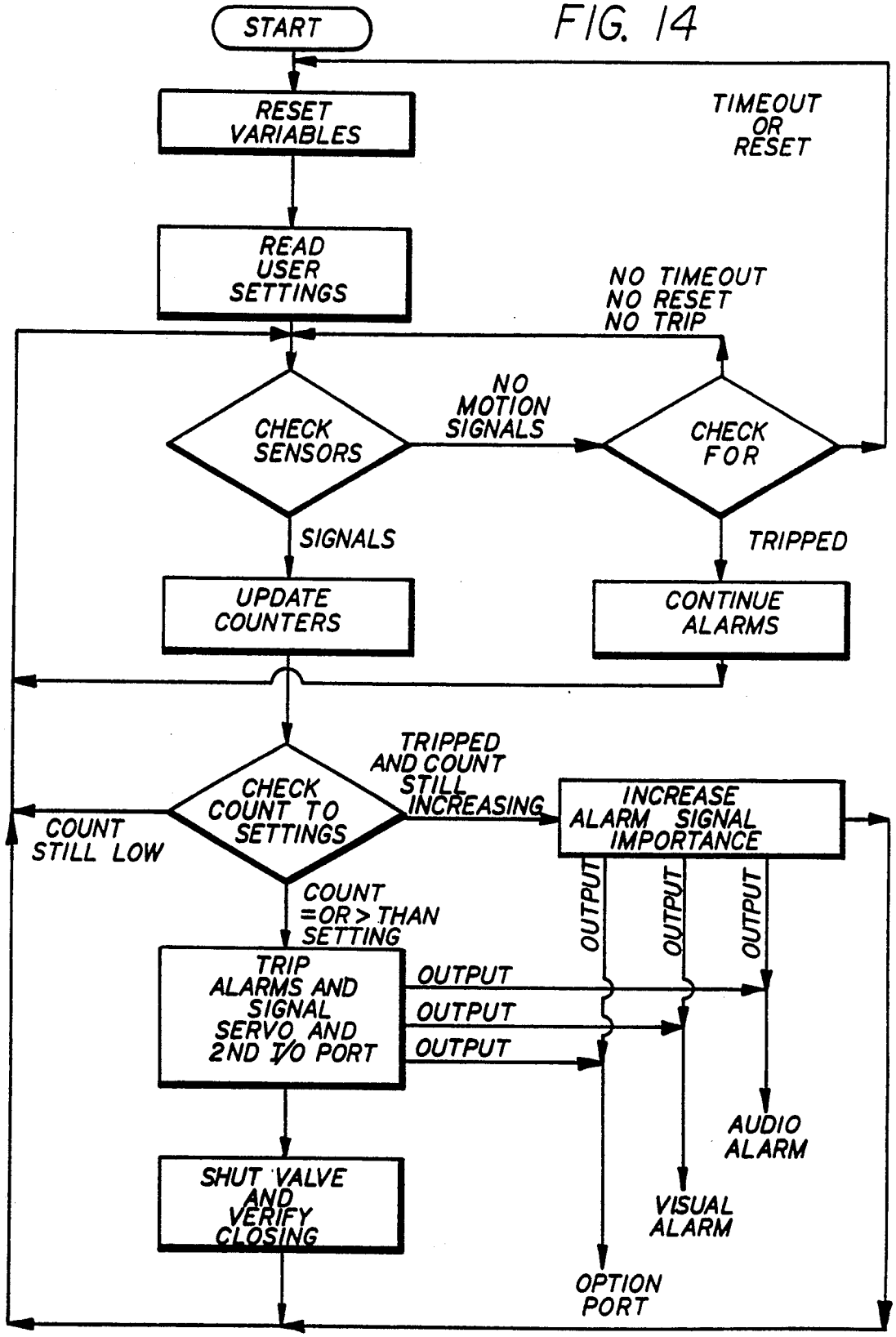
FIG. 14 is a simplified flow chart of one possible programming configuration for the basic operation of the fluid control device of the present invention.

FIG. 14 illustrates a logic flow diagram which is but one possible method for programming the fluid control system 21 to perform a variety of tasks. From the start block, the microprocessor 37 logic arrives at a "RESET VARIABLES" block where it resets the variables, then arrives at a "READ USER SETTINGS" block where it reads the user settings. The logic then proceeds to the "CHECK SENSORS" decision diamond. If there are no new motion signals, the logic arrives at the "CHECK FOR" decision diamond where the existence of the states "timeout", "reset" and "tripped" are checked. If None of the states are found, the logic flows back to the "CHECK SENSORS" decision diamond. If the "timeout" or "reset" states exist, the logic flows back to the "RESET VARIABLES" block. If the "tripped" state exists, the logic continues to the "CONTINUE ALARMS" block and then returns to the "CHECK SENSORS" decision diamond.

At the "CHECK SENSORS" decision diamond, in the event that new signals are received from the sensors, the logic flows to an "UPDATE COUNTERS" command block and then to a "CHECK COUNT TO SETTINGS" decision diamond. If the count is still low, the logic flows back to the "CHECK SENSORS" decision diamond. If the "tripped" state still exists and the count is still increasing, the logic flow proceeds to the "INCREASE ALARM SIGNAL IMPORTANCE" command block, which has outputs to the audio, visual, and option port signal lines, and then back to the "CHECK SENSORS" decision diamond.

In the event that the "CHECK COUNT TO SETTINGS" decision diamond finds that the count is equal or greater than the setting, the logic flow proceeds to the "TRIP ALARMS AND SIGNAL SERVO AND 2ND I/O PORT" command block, which also has outputs to the audio, visual, and option port signal lines, and the logic continues on to the "SHUT VALVE AND VERIFY CLOSING" command block. From the "SHUT VALVE AND VERIFY CLOSING" command block, the logic flow proceeds back to the "CHECK SENSORS" decision diamond, where the logic then continuously re-loops through the range of decision blocks addressable from the "CHECK SENSORS" decision diamond.

Figure 15:
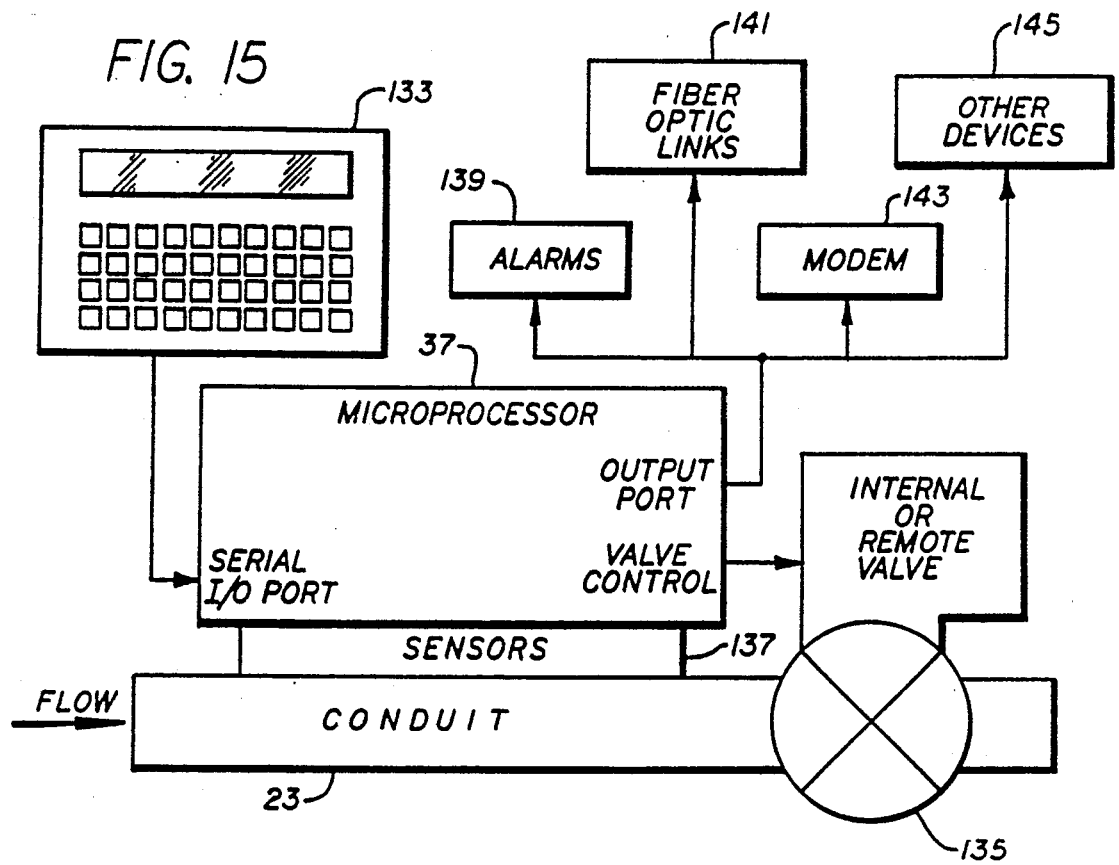
FIG. 15 is a block diagram illustrating the data flow connections between the control module and the input/output devices for the fluid control device of the present invention.

Referring to FIG. 15, a block diagram of one of several possible system configurations utilizable with the fluid control system of the present invention illustrates the use of a lap top computer 133 connected into microprocessor 37. The lap top computer 133 is utilized for portability, but a mainframe or desktop computer could just as easily be used with the appropriate data transfer devices, such as a telephone modem or packet modem. Microprocessor 37 is in communication with a valve 135 which may be internal with respect to any housing supporting microprocessor 37, such as a control valve 29, or it may be remotely located.

Microprocessor 37 is in communication with and senses flow in flow conduit 23 via a block of sensors 137. Microprocessor 37 is also enabled to activate alarms 139, fiber optic links 141, modem 143, or other devices 145. In addition, the microprocessor 37 can serve several conduits and control several valves 135. Other multiples of control connections are permissible to form a large number of interconnected control configurations.

Although FIG. 15 illustrates an embodiment which senses flow in a flow conduit, the invention is not intended to be so limited. Sensors which sense different physical parameters may be used; moreover, each sensor may sense a different physical parameter. For example, one sensor may sense flow in a conduit, while another senses pressure, while another senses temperature. Furthermore, the sensors may be remote to the microprocessor 37. For example, in addition to the parameters sensed in the previous example, another sensor may sense, say, the fluid level of a remote reservoir the conduit is feeding. The microprocessor can be programmed to close the valve when the level reaches a programmed maximum. The invention is intended to cover sensing of any parameter, including those remote from the microprocessor.

Figure 16:
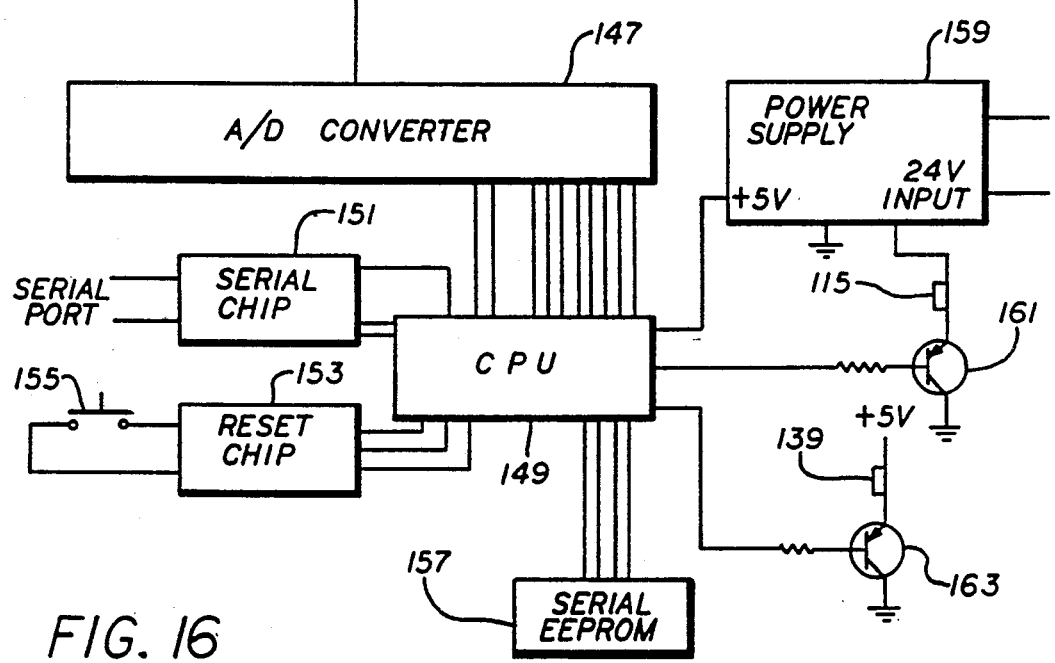
FIG. 16 is a block and circuit diagram illustrating some of the circuitry detail implementable in conjunction with the fluid control system of the present invention.

FIG. 16 illustrates the details for one embodiment of the invention. A series of eight sensors 137, each for sensing a particular parameter are connected into an analog to digital converter 147. Analog to digital converter 147 may be used to convert the signals from the sensors 137 to digital format and makes the digital format available to a central processing unit 149. Central processing unit 149, also known as a CPU, may be a microprocessor such as microprocessor 37, or any other computational entity capable of stepwise mathematical or logical operation.

A serial to parallel, or serial chip 151 is connected to CPU 149 for receiving data or instructions from outside the CPU 149, either locally or telemetered remotely from another location, through a serial port as shown. A reset chip 153 operated by a reset button 155 is enabled to reset or interrupt either the operation of CPU 149 to control fluid flow or to receive data. An EEPROM chip 157 can memorize setpoints or commands, or other quantities, even if the CPU 149 loses power, and thus provides a non-volatile memory capability.

A power supply 159, here illustrated as having a twenty-four volt input, supplies a 5 volt input to CPU 149. The twenty four volt input to power supply 159 can be supplied via batteries 121 or through a transformer (not shown) accompanied by the necessary rectification and filtering circuitry. A voltage output, of appropriate magnitude, is made available through the solenoid coil 115 and then to the emitter of a PNP bipolar junction transistor 161. The base of PNP transistor 161 is connected to CPU 149 while the collector is grounded. CPU 149 can trip transistor 161 to cause current to flow through the emitter of transistor 161 and solenoid coil 115 to trip control valve 29 of FIGS. 4a and 5. Likewise, power supply 159 can also power an alarm 139 through a PNP bipolar junction transistor 163. The base of PNP transistor 163 is connected to CPU 149 while the collector is grounded. Again, CPU 149 can trip transistor 163 to cause current to flow through the emitter of transistor 163 to energize alarm 139.

The operation of the fluid control system 21 is relatively simple. In its unenergized state, solenoid plunger 113 is extended and snaps into locking position of anchoring disk 81 when the valve handle 85 is turned and the poppet valve assembly 87 is opened. Bump stop 111 prevents the anchoring disk 81 and shaft 75 from being moved beyond the open position. Solenoid plunger 113 prevents torque spring 79 from rotating anchoring disk 81 and shaft 75.

When microprocessor 37 has made a logical decision to shut the control valve 29, it sends a signal causing current to flow through solenoid coil 115. The decision may be made on the basis of many flow sensing options, and three are specifically mentioned. The operation of a first flow sensing option is explained with reference to FIGS. 4a-7. When flow through flow conduit 23 begins, the displacement piston 41 is moved in the direction of flow relative to the rate of flow. Positive pressure from resistance spring 47 provides displacement piston 41 with resistance to the fluid flow. The location of apertures 45 with respect to displacement piston 41, when displacement piston 41 is moved through flow cylinder 43, provides for magnified piston travel resulting from trickle flow so that Hall effect sensor 67 will be able to detect trickle flow. This magnified flow also results in sufficient signal levels for representing drip leakage or trickle flow. The spring 47 force is sufficient to provide positive closure about land 57 under no-flow condition so that drop or trickle flow will have to move piston 41 a definite distance beyond Hall effect sensor 67 before flow will take place. A change in voltage signal is generated by Hall effect sensor 67, due to the influence from the magnetic field of displacement piston 41 indicates fluid flow. As displacement piston 41 moves through Hall effect sensor 67, the magnetic field in the Hall effect sensors 67 will cause the moving conductors to become crowded, thus developing a measurable change in an electric field. This field is monitored by microprocessor 37 which calculates fluid volume and rate based on this electric field, or voltage change.

In the second flow option corresponding to the second embodiment of FIGS. 8a and 8b, other mechanical or magnetic means such as reed switches operate as follows. The reed switches 103, mounted adjacent to displacement piston 41 providing voltage current or resistance changes, depending upon the circuit particulars, in relation to the movement of displacement piston 41. This voltage/resistance change is monitored by microprocessor 37 which calculates fluid volume and rate based on the voltage/resistance change.

For a third flow option corresponding to the third embodiment of FIG. 9a and 9b, means such as the tuning coil 105 operates as follows. The tuning coil 105 is mounted so as to surround flow conduit housing 40 and thereby surround displacement piston 41. Displacement piston 41 serves as a core in tuning coil 105. As displacement piston 41 moves out of tuning coil 105, the tuning coil's inductance changes. This inductance change is monitored by microprocessor 37 which calculates fluid volume and rate based on the inductance change. For example, tuning coil 105 can be part of an inductively tuned oscillator. The oscillator output frequency would change in relation to the movement of displacement piston 41.

Irrespective of the flow detection option utilized, when signaled by microprocessor 37, solenoid coil 115 retracts solenoid plunger 113 thereby releasing anchoring disk 81 and allowing shaft 76 and anchoring disk 81 to be rotated 90 degrees, stopping against bump stop 111. Therefore, the energy utilized in closing control valve 29 is the energy stored in torque spring 79. The utilization of the energy of torque spring 79 is for the purpose of minimizing the drain upon batteries 121. It is understood, however, that other means for actuating control valve 29 may be employed, as for example a servo motor and worm gear assembly engaging anchoring disk in absence of torque spring 79. In such a configuration, the valve could be automatically actuated between the open and closed positions, without the need for the "single action" operation where manual cocking is necessary before control valve 29 actuation can occur thereby allowing valve spring 91 and upstream fluid pressure in flow conduit 23 to push poppet valve assembly 87 into valve seat 89, stopping fluid flow through flow conduit 23.

Referring to FIG. 17, an improved flow sensor 210 which can be incorporated in place of flow sensor 27 in the fluid control system of FIGS. 4a. The improved flow sensor 210 comprises a housing 212 having an inlet 214 which can be connected to a fluid conduit or to a valve, such as the valve 29 illustrated in FIGS. 4a and 5, an opposing outlet 216 which can be connected to a fluid conduit or a valve, such as valve 29, and a chamber 218 which extends the length of the housing and communicates with inlet 214 and outlet 216. A baffle 220 is positioned within the chamber which bars fluid flow through the chamber. To provide for fluid flow, the baffle 220 has an orifice 222 which permits fluid flow through the chamber when the orifice is partially or fully open. Behind the baffle, within the chamber, there is located a square bore 224 which functions as a guide track. The square bore is coaxial with the orifice 222. Situated above the square bore is blind well 228 which extends from the exterior surface 229 of the housing 212 into the chamber 218 but does not come in communication with the chamber. First and second sensors 232 and 234, respectively, which can sense changes in magnetic flux, are mounted on the floor 230 of the well. About the area of the baffle 220, a blind bore 236 extends from the exterior surface 229 of the housing 212 into the baffle. The bottom of the blind bore 236 bottoms in the baffle a short distance from the orifice 222. The blind bore is adapted to receive a reed switch 238. When the reed switch is not influenced by a magnetic flux, the reed switch is normally closed.

Located within the chamber is a piston 242 having a tapered piston head 244 and longitudinal square shaft 246 axially aligned along the longitudinal axis 268. Square shaft 246 is adapted to longitudinally move within the square bore 224. The tapered piston head has a front tapered section 248 and a cylindrical rear section 250 of constant diameter. Approximate the juncture of the front section and rear section, the piston has a semicircular circumferential groove 252 in its surface to receive an O-ring 254. The O-ring 254 forms a fluid type seal between the surface of the piston head 244 and the wall of the orifice 222. The rear of the rear section 250 of the piston 242 ends in a collar 256 which acts as a stop to prevent the piston passing completely through the orifice 222 and which acts as a base for the front end of compression spring 258. The back end of compression spring 258 engages the wall 260 in front of the square bore 224.

The square shaft 246 has first and second magnets 264 and 266 embedded therein. The first magnet 264 has its poles positioned perpendicularly to the longitudinal axis 268 of the housing and piston. The second magnet 266 also has its poles positioned perpendicularly to the longitudinal axis, but the poles are reversed with respect to the polar alignment of the first magnet. The first and second sensors 232 and 234 are Hall effect transducers which are responsive to the position of the first and second magnets. As the magnets and the shank move with movement of the piston, the Hall effect transducers produce an output signal indicative of the piston position which is indicative of the fluid flow through the orifice in the same manner as piston 41 for flow sensor 27 described above. The device can also employ reed switches in place of the Hall effect transducers 232 and 234. The reed switches would work in the same manner as the reed switches 103 work with respect to the device described above with respect to FIG. 8a and 8b. Alternatively, the Hall effect transducers 232 and 234 can be replaced with a tuning coil which is influenced by the position of the magnets and which yields a signal indicative of the fluid flow through the orifice 222 in the same manner as the tuning coil 105 works with respect to the device described above with respect to FIGS. 9a and 9b. The tuning coil for the present sensor is wrapped around the body and across the floor 230 of the well 228. When a tuning coil is used, an electronic unit such as unit 106 described with respect to FIGS. 9a and 9b may be used to house the circuitry necessary to energize the tuning coil and measure changes in the inductance of the coil with the change of the magnetic flux.

The signal from the sensor, either a Hall effect transducer, reed switches or a tuning coil, is directed to a system such as the system shown in FIG. 16, to close a valve, sound an alarm, transmit a signal alarm, or perform another function as described above. Likewise, the embodiment illustrated in FIG. 16 can be used in connection with the flow sensor 210 of FIGS. 17 and 18 with the output from the flow sensor 210 being one of the eight sensors 137 of FIG. 16.

The flow sensor 210 of FIG. 17 and 18 has two states, either there is no fluid flow through the flow sensor or there is fluid flow through the flow sensor. When there is fluid flow through the flow sensor, there are a number of discrete flow rates which the flow sensor can measure. With no fluid flow, the piston 242 is fully seated in the orifice 222 preventing all fluid flow through the flow sensor. As fluid pressure builds up on the inlet side 214, the piston is pushed back out of the orifice 222, compressing the spring 258. The piston has a magnet 272 which activates reed switch 238. When the piston is fully seated in the orifice, the magnetic field of the magnet 272 opens the normally closed reed switch 238. As the piston backs out of the orifice, the magnetic field about the reed switch 238 weakens because of the increasing distance between the reed switch and the magnet 272 and the reed switch closes. The reed switch acts as a fluid flow/no-flow sensor, indicating to the microprocessor when flow has commenced or ceased. Thus when the reed switch closes, the Hall effect transducers are energized and sense the change in the magnetic field caused by the longitudinal movement of the first and second magnets 264 and 266. No fluid flow occurs until the piston has backed out of the orifice to the point where the O-ring 254 exits the orifice 222. As the fluid flow increases, the piston head is further forced out of the orifice. The increasing fluid flow requires a greater opening between the orifice walls and the tapered surface of the piston head; the increasing fluid flow accomplishes this by forcing the piston back out of the orifice against the force of the compression spring 258. The increased axial displacement of the piston proportionally increases the force exerted against the compression spring 258. If the fluid flow decreases, the pressure created by the fluid flow decreases and the compression spring pushes the piston back towards, or into, the orifice. Thus during fluid flow, the force of the flowing fluid applied against the piston head is balanced by the opposing force of the compression spring 258.

When the orifice 222 is open, fluid can flow through the inlet 214, through the orifice 222, through the channel 274 and through the outlet 216. As described above, the system incorporating the fluid flow sensor can be programmed to act when the sensor senses no flow, any flow or a predetermined flow. When there is no flow and Hall effect transducers are used as sensors, the transducers are de-energized because reed switch 238 is open and the Hall effect transducers transmit no signal to the control system, such as the control systems illustrated in FIGS. 15 and 16. If reed switches are used in place of Hall effect transducers, reed switch 238 is not required since reed switches do not generate a signal and thus do not constitute an energy draw. Reed switch 238 could be used to determine flow/no-flow through the system as described above. When fluid flow commences through the sensor, the magnet 272 and the reed switch 238 are designed such that the reed switch will close, thus powering up the Hall effect transducers. In this configuration, the first magnet 264 will be aligned directly underneath the first sensor 232. As fluid flow increases, the piston is displaced axially out of the orifice, moving the first magnet from its position underneath the first sensor 232 towards the second sensor 234 and simultaneously the second magnet 266 moves towards first sensor 232. This is schematically illustrated in FIG. 21.

FIG. 21 shows the two magnets in eight positions with respect to each other. In actual operation, the position of the magnets can be at any place between positions 1 and 8, not just in incremental positions 2-7. The signals generated by the first and second sensors are illustrated in FIGS. 19 and 20. At position 1, the system is off because the reed switch is open. When the piston has been displaced so that the first magnet is at position 2, the reed switch will have closed and the sensors 232 and 234 will have been activated. FIG. 19 illustrates the signal generated by the first sensor 232. Referring to FIGS. 19 and 20, as the first magnet proceeds from position 2 through position 5, the first sensor 232 senses the positions of the first magnet and sends out a signal in response thereto illustrated in the third quadrant of the graph of FIG. 19. As the first magnet moves from its fifth position to its sixth position, the second magnet moves from its fifth to its sixth position bringing the second magnet closer to the first sensor 232 than the first magnet. The first sensor 232 transmits a signal in response to the magnetic field of reverse polarity of the second magnet which is shown in the first quadrant of the graph of FIG. 19. Simultaneously, the second sensor 234 commences picking up the magnetic field of the first magnet when it reaches position 5 and continues to track the position of the first magnet as it moves between positions 5 and 8 to give an appropriate signal as shown in the fourth quadrant of the graph of FIG. 20. In actual practice, the signals from the first sensor and second sensor will be sent to a microcomputer which will integrate the two signals to yield a signal which is indicative of the position of the two magnets with respect to the two sensors and which will be directly proportional to the flow rate flowing through the flow sensor 210.

When Hall effect transducers 232 and 234 are replaced with reed switches, the use of reed switch 238 is not necessary since reed switches do not per se draw power unless the switch is closed. When the sensors 232 and 234 are replaced by a tuning coil, the reed switch 238 may or may not be used depending upon the type of coil sensor used. Some coils are unpowered and generate a power signal when subject to a changing magnetic flux. Other coil sensors are subject to a current flow and would benefit from reed switch 238 to minimize power consumption. In the latter case, the reed switch acts as a fluid flow/no-flow sensor, indicating to a microprocessor the flow/no-flow status. When the reed switch closes, the microprocessor receives the signal from the reed switch and powers up the sensing coil to measure the amount of fluid flow through the orifice. When the piston is seated in the orifice, the reed switch opens, signaling no fluid flow to the microprocessor and the microprocessor powers off the sensing coil to minimize power consumption. This type of arrangement is very beneficial for battery powered systems.

To help guide the piston head in and out of the orifice, the piston head is fitted with four vanes 274 which are arranged at right angles to one another. The vanes center the piston head in the orifice so that the longitudinal axis of the piston remains coaxial with the longitudinal axis of the orifice 222 and square bore 224 to minimize resistance and friction to the longitudinal movement of the shank 246 through the bore and the piston head 244 in orifice 222.

The foregoing disclosure and description of the invention are illustrative and explanatory thereof, and various changes in the values, tolerances, power source, method of measuring the position of the displacement piston, logic flow diagram and system configuration, as in the details of the illustrated construction may be made without departing from the spirit and scope of the invention.

What is claimed is:

1. A sensor device for sensing fluid flow comprising:
   a hollow housing having a chamber in communication with an opposing inlet and outlet, and a guide track within the chamber between the outlet and inlet;
   a baffle located within the chamber between the inlet and guide track, the baffle having an orifice for fluid flow:
   a tapered piston having a longitudinal shank, the tapered piston adapted to move within the orifice in a sealed relationship preventing flow through the orifice and the piston adapted to move in and out of the orifice to close and open the orifice to fluid flow, the piston, when seated in the orifice, sealing off the orifice to prevent fluid flow through the chamber, the longitudinal shank adapted to be guided in the guide track and to move longitudinally within;
   biasing means within the chamber biasing the piston into the orifice;
   a first magnet within the longitudinal shank, the magnet arranged with its poles perpendicular to the longitudinal axis of the shank;
   a means for sensing magnetic flux changes located on the housing outside the chamber, the means for sensing adapted to sense the change of position of the first magnet when the shank is longitudinally moved as the piston is moved in and out of the orifice to measure the fluid flow through the orifice;
   a piston head magnet in the piston; and
   a reed switch located within the baffle which is responsive to the movement of the piston head magnet as the piston moves within the orifice.

2. A device according to claim 1 wherein it includes a second magnet in the shank longitudinally spaced apart tandemly from the first magnet, the second magnet arranged with its poles perpendicular to the longitudinal axis of the shank and reversed to the poles of the first magnet.

3. The device according to claim 2 wherein the sensing means comprises two sensing elements for sensing magnetic flux changes, the sensing elements longitudinally spaced apart in tandem parallel to the longitudinal shank.

4. The device according to claim 3 wherein the distance between the first and second magnets is substantially equivalent to the distance between the first and second sensor elements.

5. The device according to claim 3 wherein each sensing element is a reed switch.

6. The device according to claim 1 wherein the tapered piston has a bullet shaped head portion and a cylindrical rear portion of constant diameter.

7. The device according to claim 6 wherein the piston has a circumferential groove on its outer surface about the cylindrical rear portion, and an O-ring adapted to be received within the circumferential groove, the O-ring adapted to form a movable seal between the wall of the orifice and the outer surface of the piston.

8. The device according to claim 1 wherein the bullet shaped head has at least three guide elements extending axially in front of the bullet shaped head portion of the piston to guide the piston in and out of the orifice.

9. The device according to claim 8 wherein the bullet shaped head has four fin shaped guide elements extending axially in front of the bullet shaped head portion.

10. The device according to claim 1 wherein the reed switch is opened by the piston head magnet when the piston is seated in the orifice preventing fluid flow through the orifice, the read switch closing when the piston commences withdrawing out of the orifice.

11. The device according to claim 1 wherein the reed switch produces a signal when the piston is moved within the orifice.

12. The device according to claim 11 wherein the sensing means is powered by an external electrical energy source from a control means including a power source and a microprocessor; the signal from the reed switch being communicated to the microprocessor, when the reed switch indicates that there is no fluid flow, the microprocessor powering off the sensing means and the reed switch when indicating there is fluid flow through the orifice communicating the signal to the microprocessor which powers on the sensing means to measure the fluid flow through the orifice.

13. The device according to claim 12 wherein the sensing means comprises two sensing elements for sensing magnetic flux changes, the sensing elements,longitudinally spaced apart in tandem fashion parallel to the longitudinal shank, two sensing elements having electrical leads connected with the control means.

14. The device according to claim 13 wherein the distance between the first and second magnets is substantially equivalent to the distance between the first and second sensor elements.

15. The device according to claim 13 wherein the sensor elements are Hall effect transducers.

16. The device according to claim 1 wherein the sensing means is a reed switch.

17. The device according to claim 1 wherein the sensing means is a tuned coil.

18. The device according to claim 1 wherein the biasing means is a spiral spring under compression mounted about the longitudinal shank with one end of the spring engaging the guide track and the other end of the spring engaging the tapered piston to bias the tapered piston into the orifice.

19. The device according to claim 1 wherein the longitudinal shank has a square cross-sectional area and the guide track has a square cross-sectional area to prevent the shank from rotating.

20. The device according to claim 1 including means for preventing rotation of the shank within the housing about its longitudinal axis.

* * * * *